(12) United States Patent
Riza et al.

(10) Patent No.: US 7,092,079 B2
(45) Date of Patent: *Aug. 15, 2006

(54) DIGITAL OPTICAL BEAM PROFILER

(75) Inventors: Nabeel Agha Riza, Oviedo, FL (US); Muhammad Junaid Mughal, Orlando, FL (US)

(73) Assignee: Nuonics, Inc., Winter Park, FL (US)

( * ) Notice: Subject to any disclaimer, the term of this patent is extended or adjusted under 35 U.S.C. 154(b) by 547 days.

This patent is subject to a terminal disclaimer.

(21) Appl. No.: 10/657,808

(22) Filed: Sep. 8, 2003

(65) Prior Publication Data

US 2004/0125361 A1    Jul. 1, 2004

Related U.S. Application Data

(63) Continuation of application No. 10/360,037, filed on Feb. 7, 2003, now Pat. No. 6,922,233.

(60) Provisional application No. 60/456,191, filed on Mar. 20, 2003, provisional application No. 60/408,829, filed on Sep. 6, 2002.

(51) Int. Cl.
*G01J 1/00* (2006.01)

(52) U.S. Cl. ...................................... 356/121

(58) Field of Classification Search ................. 356/121
See application file for complete search history.

(56) References Cited

U.S. PATENT DOCUMENTS 3,617,755 A    11/1971    Arnaud
5,064,284 A    11/1991    Johnston, Jr. et al.

*Primary Examiner*—Gregory J. Toatley, Jr.
*Assistant Examiner*—Amanda Merlino
(74) *Attorney, Agent, or Firm*—James H. Beusse; Beusse Wolter Sanks Mora & Maire, P.A.

(57) ABSTRACT

An agile optical beam profiler using a two-dimensional small tilt digital micromirror device/chip, a translation stage, and single photodetector or pair of photodetectors. A method of profiling an optical beam includes positioning a programmable spatial light modulator in an incident optical beam and sequentially moving the spatial light modulator to at least one position in a first planar direction in a displacement increment less than a pixel width of the spatial light modulator. The method also includes directing respective portions of the optical beam to a photodetector at each position of the spatial light modulator. The method may also include calibrating the photodetectors by directing a portion of the beam to the photodetector, then directing the entire beam, or a remaining portion of the beam, to the photodetector, and normalizing the detected power of the portion with the detected power of the entire beam, or remaining portion, respectively.

22 Claims, 10 Drawing Sheets

Fig. 4(A-D)

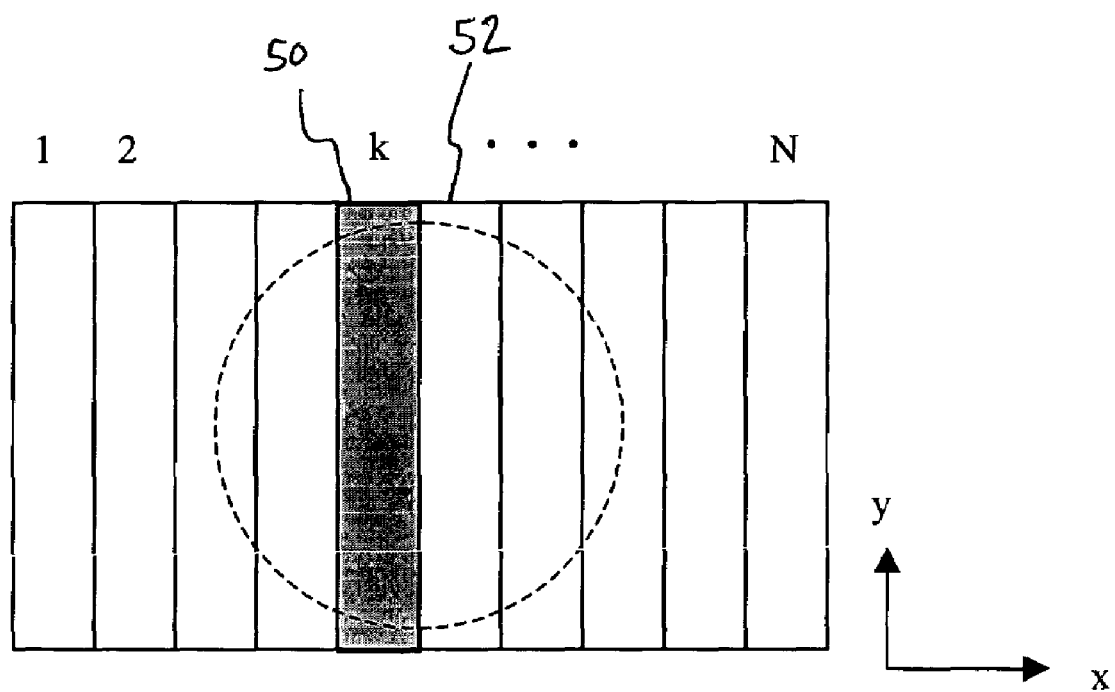
A.
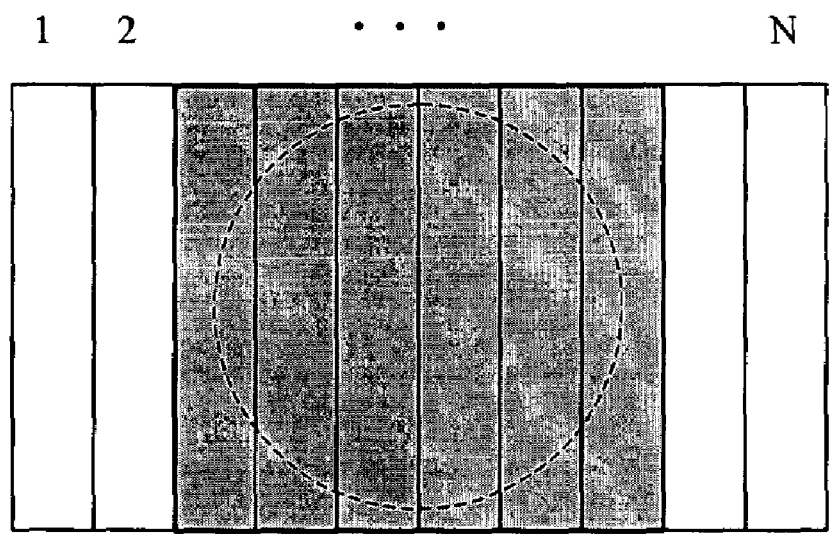
B.
Fig. 8 (A-B)

DIGITAL OPTICAL BEAM PROFILER

SPECIFIC DATA RELATED TO INVENTION

This Continuation-in-Part application claims the benefit of U.S. application Ser. No. 10/360,037 filed Feb. 7, 2003, now U.S. Pat. No. 6,922,233, incorporated herein by reference. This application also claims the benefit of U.S. Provisional Patent Application No. 60/408,829 filed Sep. 6, 2002, and U.S. Provisional Patent Application No. 60/456,191 filed Mar. 20, 2003, incorporated herein by reference.

FIELD OF INVENTION

The present invention is generally related to optical beam profile measurement systems, and, specifically, to a digital optical beam profiler using a spatial light modulator.

BACKGROUND OF THE INVENTION

Since the invention of laser in the 1960s, lasers have been used extensively in a variety of applications ranging from laser research, optical communications, and material processing to optical metrology. In these applications, it is very important to know the parameters that can describe the laser beam. Optical beam radius is one of these parameters and it is defined as the distance between the maximum optical power or intensity point of the optical beam and the position where the optical beam intensity is reduced by a factor of $1/\exp(2)$. Another important parameter is the optical beam waist position along the laser beam. Over the past decades, several techniques involving moving mechanical elements have been proposed and experimentally demonstrated to determine, or "profile," the optical beam, including measuring the optical beam radius and the optical beam profile, or shape and position of an optical beam cross section. Such profiling techniques include the use of a one dimensional (1-D) moving knife edge, see J. A. Arnaud and C. Neck, Apparatus for locating and measuring the beam-waist radius of a Gaussian laser beam, U.S. Pat. No. 3,617,755, issued Nov. 2, 1971; J. A. Arnaud, et. al., *Technique for Fast Measurement of Gaussian Laser Beam Parameters*, APPLIED OPTICS, Vol. 10, No. 12, 2775–2776, (December 1971), a 2-D moving knife edge, see T. F. Johnston and G. H. Williams, Apparatus for Measuring the Mode Quality of a Laser Beam, U.S. Pat. No. 5,064,284, issued Nov. 12, 1991; a translating pinhole, see P. J. Shayler, *Laser Beam Distribution in the Focal Region*, APPLIED OPTICS, Vol. 17, No. 17, 2673–2674, (September 1978); an encircled energy principle via a variable aperture, see P. J. Brannon, et. al., *Laser Focal Spot Measurements*, JOURNAL OF APPLIED PHYSICS, Vol. 46, No. 8, 3576–3579, (August 1975), a scanning slit, see M. K. Giles and E. M. Kim, *Linear Systems Approach to Fiber Characterization Using Beam Profile Measurements*, SPIE CONFERENCE ON FIBER OPTICS: SHORT-HAUL AND LONG-HAUL MEASUREMENTS AND APPLICATIONS, Vol. 500, 67–70, (August 1984), and a rotating mirror to scan the laser beam across a photodetector, see C. P. Wang, *Measuring 2-D Laser-beam Phase and Intensity Profiles: A New Technique*, APPLIED OPTICS, Vol. 23, No. 9, 1399–1402, (May 1984), all of which are incorporated herein by reference.

Other optical beam profile measurements were also demonstrated including methods based on multiphoton ionization effect, see E. H. A. Granneman and M. J. van der Wiel, *Laser Beam Waist Determination by Means of Multiphoton Ionization*, REVIEW OF SCIENTIFIC INSTRUMENTS, Vol. 46, No. 3, 332–334, (March 1975) fluorescence correlation spectroscopy, see S. M. Sorscher and M. P. Klein, *Profile of a Focused Collimated Laser Beam Near the Focal Minimum Characterized by Fluorescence Correlation Spectroscopy*, REVIEW OF SCIENTIFIC INSTRUMENTS, Vol. 51, No. 1, 98-102, (January 1980), 2-D photodiode array, see J. T. Knudtson and K. L. Ratzlaff, *Laser Beam Spatial Profile Analysis Using a Two-dimensional Photodiode Array*, REVIEW OF SCIENTIFIC INSTRUMENTS, Vol. 54, No. 7, 856–860, (July 1983), photo-thermal deflection, see A. Rose, Y.-X. Nie, and R. Gupta, *Laser Beam Profile Measurement by Photothermal Deflection Technique*, APPLIED OPTICS, Vol. 25, No. 11, 1738–1741, (June 1986), and thermographic instrument, see T. Baba, T. Arai, and A. Ono, *Laser Beam Profile Measurement by a Thermographic Technique*, REVIEW OF SCIENTIFIC INSTRUMENTS, Vol. 57, No. 11, 2739–2742, (November 1986), all of which are incorporated herein by reference.

However, some limiting factors such as wavelength sensitivity in multiphoton ionization method, the need of a dilute solution in fluorescence correlation spectroscopy technique, and the requirement to use high power pulse laser for thermal graphic techniques are the reasons that have propelled the simpler moving mechanical element and the 2-D photodiode array approaches to being commercially dominant. These common mechanical scanning methods use scanning elements that are moved in an analog fashion and therefore require precise analog voltage control that adds cost and complexity to the optical beam profilers. Furthermore, hysteresis and motion sensitivity limits in mechanical elements reduce profiler measurement repeatability.

Hence, it would be highly desirable to digitally control the motion of the scanning elements. This type of new all-digital profiler is proposed in S. Sumriddetchkajorn and N. A. Riza, *Micro-electro-mechanical system-based digitally controlled optical beam profiler*, APPLIED OPTICS, Vo. 41, No. 18, (June 2002). For this innovative all-digital profiler, it would be highly desirable to reduce the digital motion limitations that limit resolution to the digital physical step of the mechanical element such as knife-edge or slit. Furthermore, it would be useful to introduce new beam profiling methods that take full advantage of the complete micromirror or pixel programmability of the 2-D pixilated device, such as a digital mirror device (DMD), leading to a higher resolution beam profile measurement. In the past, beam profilers have susceptible to optical source power fluctuations that can lead to inaccurate spatial profile measurements. Thus, an optical beam profiler insensitive to optical power fluctuations is desired.

SUMMARY DESCRIPTION OF THE INVENTION

A method of profiling an optical beam is described herein as including positioning a programmable spatial light modulator in an incident optical beam. The method also includes sequentially moving the spatial light modulator to at least one position in a planar direction in a displacement increment less than a pixel width of the spatial light modulator. The method further includes directing respective portions of the optical beam to a photodetector at each position of the spatial light modulator. The method may also include detecting power at a photodetector by sequentially commanding respective sets of pixels in the spatial light modulator to direct respective portions of the optical beam to a photodetector. The method may further include commanding, for each set, at least the pixels in the spatial light modulator illuminated by the optical beam, to direct the optical beam to the photodetector.

A system for profiling an optical beam is described herein as including a programmable spatial light modulator for selectively directing light from an incident optical beam. The system also includes a translation stage for moving the spatial light modulator in relation to the incident optical beam. The system further includes a photodetector for detecting a power of light directed by the spatial light modulator.

DESCRIPTION OF THE DRAWINGS

The present invention will become apparent from the following detailed description of the invention when read with the accompanying drawings in which:

FIG. 8A. illustrates time multiplexed DMD settings for a beam profiling technique using a single PD wherein power from a simulated slit k is directed to the photo detector PD.

FIG. 8B. illustrates time multiplexed DMD settings for a beam profiling technique using a single PD wherein power from the whole beam is directed to the photo detector PD.

DETAILED DESCRIPTION OF THE INVENTION

In general, the invention includes a programmable spatial light modulator for selectively directing light from an incident optical beam and a photodetector for detecting an intensity of the light directed by the spatial light modulator.

Figure 1:
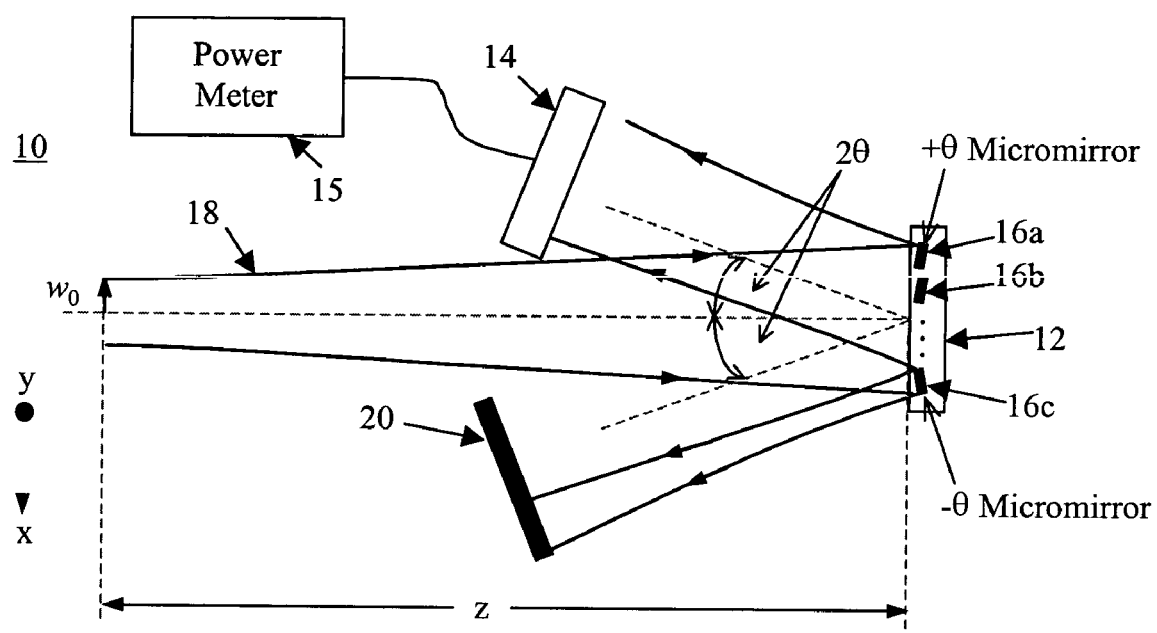
FIG. 1 shows the basic structure of an embodiment of the invention implemented as a MEMS-based digitally controlled optical beam profiler using a two-dimensional (2-D) small tilt micromirror device.

The basic structure of an embodiment implemented as a digitally controlled MEMS-based optical beam profiler 10 is shown in FIG. 1. In an aspect of the invention, the beam profiler 10 uses a 2-D small tilt micromirror device 12 and a 2-D photodetector 14. Each micromirror 16a, 16b, and 16c, of the micromirror device 12 may have two states of operation: $+\theta$ and $-\theta$ mirror positions. As seen in FIG. 1, when the desired micromirrors are set to $+\theta$ position (for example, as shown by the angular position of micromirrors 16a and 16b) the corresponding part of the optical beam 18 is reflected to the photodetector 14 and the power of detected light can be measured by a power meter 15. In another aspect, the optical beam 18 can be directed to an absorber 20 when the specified micromirrors are set to the $-\theta$ position (for example, as shown by the angular position of micromirror 16c). In an embodiment, each micromirror 16a, 16b, and 16c, is individually controllable and can correspond to one pixel of the 2-D photodetector 14.

Hence, in an aspect of the invention, a 2-D photodiode array-based optical beam profiler 10 is formed. In addition, because the micromirrors 16a, 16b, and 16c are arranged in 2-D space and the desired micromirrors can be tilted to the $+\theta$ or $-\theta$ mirror position, the motion of mechanical elements used in conventional beam profiling techniques, such as a moving knife edge, a scanning slit, a scanning pinhole, and a variable aperture can be digitally performed. In a further aspect of the invention, the resolution of the optical beam profile measurement is determined by the pixel size, i.e., the size of the micromirrors, such as 16a, 16b, 16c, and the gap between adjacent micromirrors.

In an embodiment, the digital optical beam profiler can use a VGA format design 2-D digital micromirror device (DMD) available, for example, from Texas Instrument Corporation, as the 2-D small tilt micromirror device used in the optical beam profiler structure. See R. L. Knipe, *Challenges of a Digital Micromirror Device™: Modeling and Design*, PROCEEDINGS OF SPIE, Vol. 2783, 135–145, (1996). For example, the key features and specifications of a 2-D DMD may be as follows: the size of each micromirror in the array is 16 μm×16 μm and the gap between adjacent mirrors is 1-μm. The device optical efficiency for the visible light region is approximately 62%, limited by the fill factor, the mirror reflectivity, and the device diffraction effect. Each micromirror can be set to tilt at +10° or −10° in a response time of 15 μs.

The above described 2-D DMD has recently been used to implement fiber-optic beam control modules for use in wavelength division multiplexed (WDM) light wave systems. See N. A. Riza and S. Sumriddetchkajorn, "*Digitally Controlled Fault-tolerant Multi-wavelength Programmable Fiber-optic Attenuator using a Two-Dimensional Digital Micromirror Device,*" OPT. LETTERS. 24, 282–284, (Mar. 1, 1999) and N. A. Riza, *Fault-tolerant Fiber-optical Beam Control Modules*, U.S. Pat. No. 6,222,954, issued Apr. 24, 2001. Here, the DMD is coupled with fiber-optics to create a variable optical attenuator (VOA). Variable optical attenuation is provided by digitally changing the tilt settings of the many mirrors on the DMD to direct light into or away from fiber-optics so that the light entering the fiber-optics is controlled in power.

In the proposed invention, using the same basic structure of mirror device and optical receiver, calculating the unknown beam profile by measuring the power received on a photoreceiver, or photodetector array, can be accomplished. For a VOA, the optical beam profile is known, and hence a given attenuation generation can be produced by controlling the appropriate number, location, and position of the micromirrors. Hence, by using a simple and novel application of a conventional VOA optical system techniques, a spatial light modulator, such as a DMD, based digital profiler for optical beams can be realized.

Figure 2A:
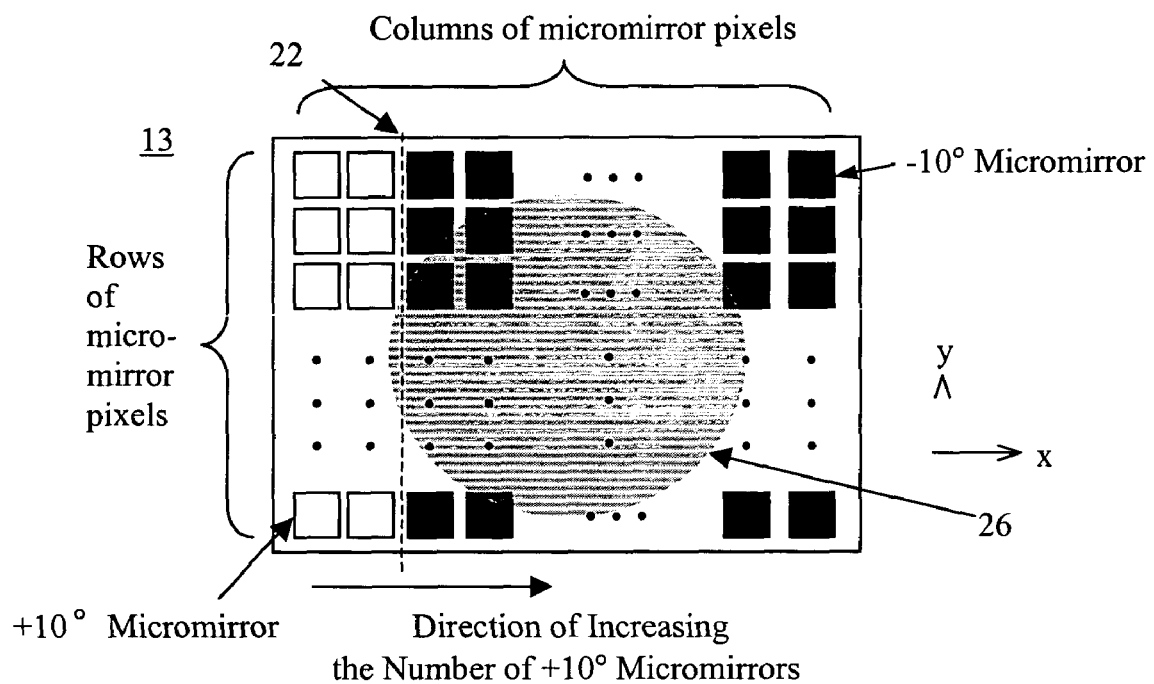
FIG. 2A depicts the working principles of an embodiment of the digital beam profiler simulating a 2-D knife edge optical beam profiling method translating in an x axis mode.
Figure 2B:
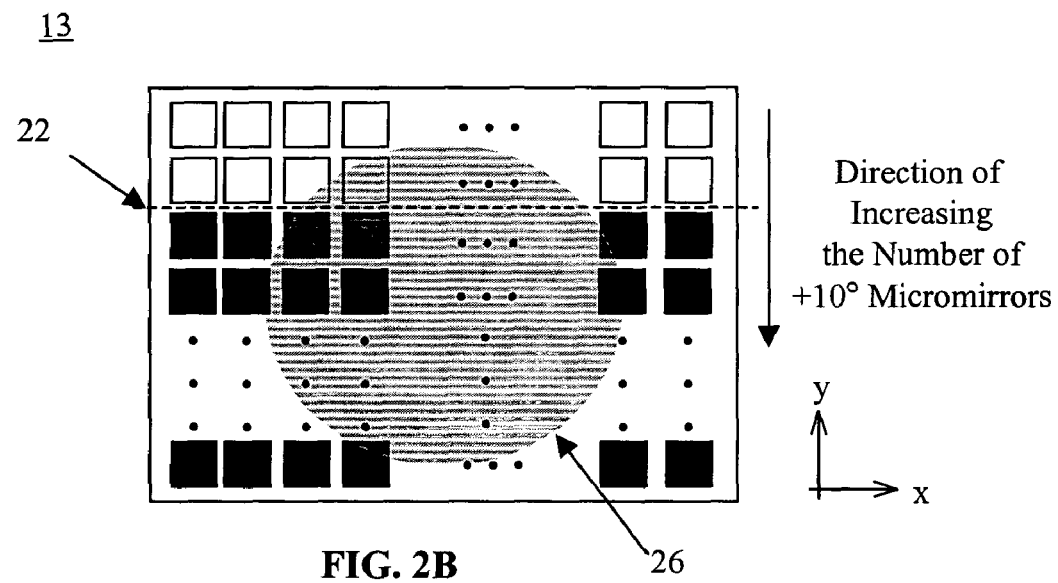
FIG. 2B depicts the working principles of an embodiment of the digital beam profiler simulating a 2-D knife edge optical beam profiling method translating in an y axis mode.

Referring now to the embodiments depicted in FIGS. 2A and 2B, the procedure for digitally implementing a 2-D moving knife edge (conventionally performed using mechanical arrangements) via a 2-D DMD digital beam profiler, is described. First, all micromirrors (depicted as square symbols in FIGS. 2A and 2B) in the 2-D DMD 13 are set to the −10° position (depicted as blank squares in FIGS. 2A and 2B) so that an optical beam having an optical beam cross section 26 incident on the 2-D DMD 13 is reflected, for example to an absorber 20 as shown in FIG. 1. Then, a simulated vertical knife edge 22 is produced by sequentially changing the orientation of a linear set, such as a column, of micromirrors in a 2-D DMD 13 from the −10° position to a +10° position so that a portion of the optical beam cross section 26 incident on the column of micromirrors oriented in the +10° position reflect light to a photodetector 14 as in FIG. 1. In this example, sequentially means on a column-by-column basis. In one aspect, after a respective column has been reoriented from a −10° position to a +10° position, the respective column remains in the +10° position, as successive columns are sequentially reoriented. For example, after the columns in the 2-D DMD 13 have initially been set to the −10° position, a first column at a left side of the 2-D DMD 13 is set to the +10° position. Then, a second column adjacent to the first column is reoriented to the +10° position, while the first column remains in the +10° position. Next, a third column, adjacent to the second column is reoriented to the +10° position, while the first column and second columns remain in the +10° position. This process is repeated until reaching a last column on the right side of the 2-D DMD 13. Accordingly, the optical beam cross section 26 is horizontally scanned along an x-axis by sequentially reflecting portions of the optical beam to the photodetector, where the power level of the respective portions of the reflected light can be measured.

Similarly, as shown in FIG. 2B, the optical beam cross section 26 can be vertically scanned along a y-axis using the technique of sequentially changing the orientation of a linear set, such as a row, of micromirrors in a 2-D DMD 13 from the −10° position to the +10° position. In this example, sequentially means on a row-by-row basis. Accordingly, a horizontal knife edge 24 is simulated as vertically moving through the optical beam cross section 26 to selective reflect portions of the optical beam to the photodetector.

In both cases, the position of the simulated knife edge 24, 26 is equal to Nd, where N is the number of columns or rows containing the +10° micromirrors and d is the pixel size (e.g., 16-µm for TI 2-D DMD). By correlating the respective commanded pixels of the 2-D DMD 13 with a respective detected power of each potion of incident light correspondingly reflected to the photodetector; and processing all the correlated detected powers for a scan of an optical beam cross section, an optical beam profile of the incident optical beam can be determined. For example, curve fitting, as known in the art, can be employed to determine respective parameters of the received optical beam, such as beam radii in the x and y directions.

A MEMS-based optical beam profile measurement method has been described that uses an array of 2-D small tilt micromirrors. This digital profiler approach has opened up the important possibility of performing several moving mechanical element-based beam profiling techniques. The combination of the 2-D small tilt micromirror array and a photodetector inherently forms a 2-D photodetector array-based optical beam profiler. Key features of the proposed profiler include fast speed, digital control, high measurement repeatability, low polarization sensitivity, fault-tolerance, and broadband wavelength operation via 2-D micromirror arrangement and mirror binary operation. Other 2-D pixel array devices such as a liquid crystal-based 90° polarization rotator device sandwiched between cross polarizers can also be exploited for this profiler for optical beams whose polarization direction is known. Still other spatial light modulator technologies may be used, including magneto-optics, multiple quantum wells, electro-optic polymers, and photonic crystals. Both optically and electrically addressed spatial light modulation devices can be employed to realize the proposed digital optical beam profiler. In addition, other scanning techniques may be employed by controlling individual pixels of a spatial light modulator. For example, single pixels or groups of pixels may be commanded to direct light to a photodetector to create a pixel map of an optical beam cross section. Furthermore, the photodetector may comprise a number and pattern of photodetector elements that corresponds to the number and pattern of the pixels in the spatial light modulator, so that a one-to-one correspondence between a respective spatial light modulator pixel and a photodetector element may be used.

Figure 3:
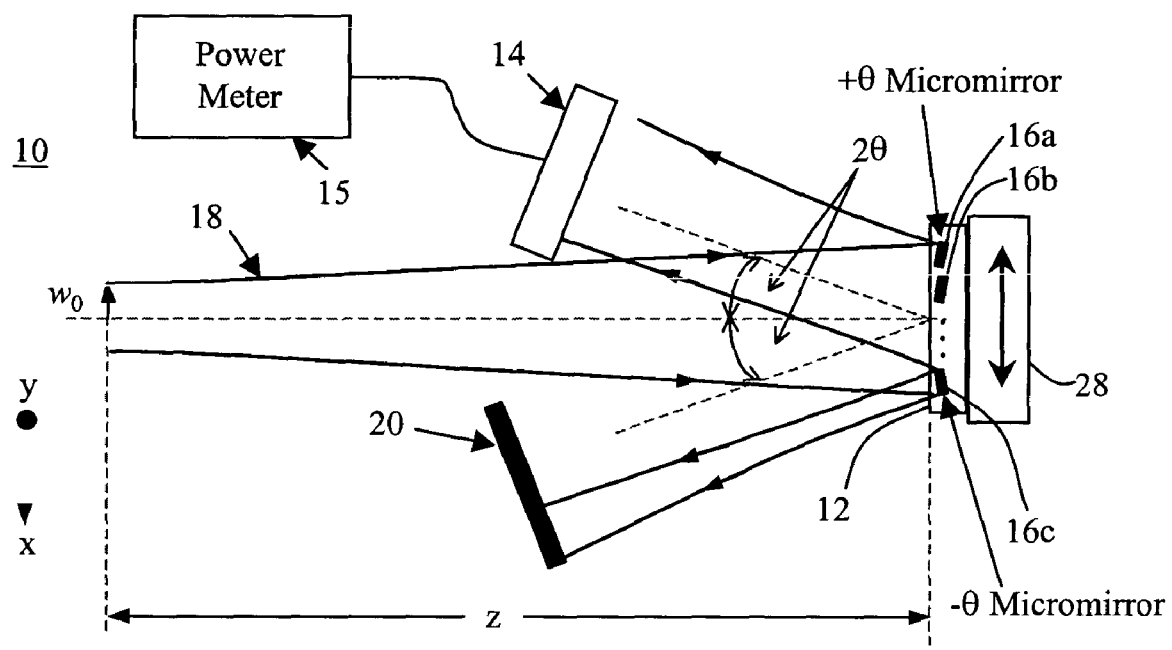
FIG. 3 shows a basic structure of an embodiment of the invention implemented as a MEMS-based digitally controlled optical beam profiler using a two-dimensional (2-D) small tilt micromirror device.

In a further aspect of the invention, the resolution of the optical beam profile measurement is determined by the pixel size, for example, the size of the micromirrors in the DMD and the gap between adjacent micromirrors. As shown in FIG. 3, the micromirror device 12 may be attached to a translation stage 28 for providing movement in planar directions, such as perpendicular to the optical beam 18. Generally, the invention includes a combined digital-analog controlled optical beam profiler that uses an array of 2-D small tilt micromirrors, or DMD's, in combination with an analog fine motion of the 2-D chip with motion in the x and y directions within a single pixel range. Because small pixel range chip motion in x and y is required for the proposed invention, relatively small distances, such as up to a pixel width, are traveled, which means that faster translation can be achieved. This is unlike other motion methods where translation over the entire beam aperture is required that can take a relatively long time compared to the technique of the current invention. In an embodiment, the small tilt micromirror device is based on the mature microelectromechanical system (MEMS) technology that offers low cost compact mechanical elements with low electrical analog/digital drive control via the use of low cost batch fabrication techniques similar to semiconductor electronic chip production methods. The chip x-y analog motion can be implemented via a number of electrically actuated mechanisms such as piezo-electric stages, MEMS actuator-based stages, magnetically controlled stages, etc. In general, any 2-D multi-pixel transmissive/reflective/absorptive device can be used in the proposed optical beam profiler. As the size of the pixels in the MEMS chip/DMD is fixed, there may be a lower limit on the step size and hence the resolution in the all-digital beam profile measurement. This lower limit can be further lowered by subdividing the pixels into smaller sample points. This is achieved by displacing the DMD chip by a know distance within a pixel pitch in its plane and repeating the beam profile measurement, to provide multiple (e.g., ten) profiling measurements for a given fine chip translation in the horizontal and vertical directions to the beam optical axis. Then by using the data taken at different chip position, the power at the sub-pixel (e.g., one tenth of the pixel size) level can be calculated mathematically, leading to a high resolution profile map.

Figure 4:
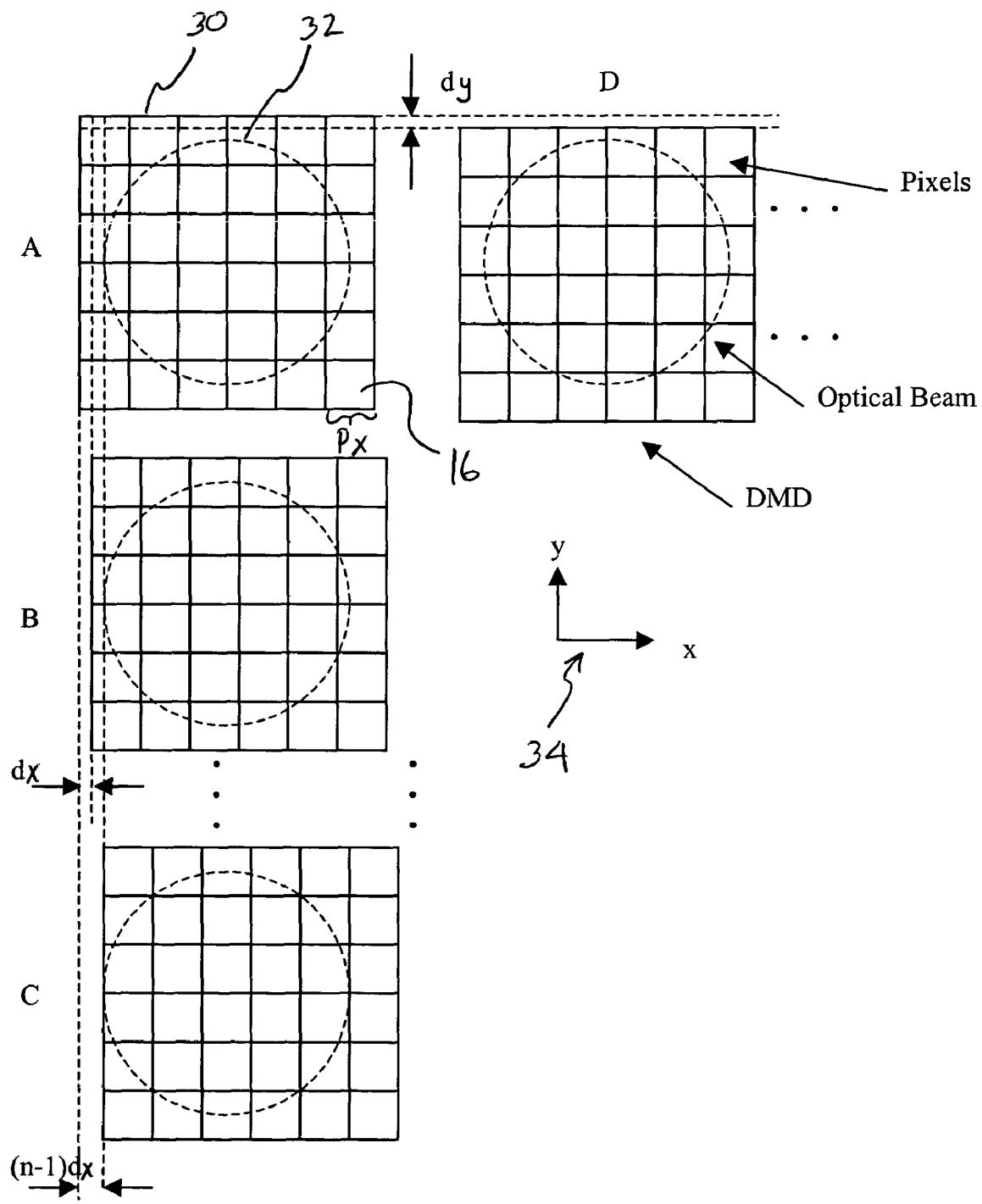
FIG. 4A shows a basic implementation of an embodiment of the digital-analog optical beam profiler using a MEMS-based digital-analog motion controlled two-dimensional (2-D) small tilt micromirror device on a x-y translation stage.
FIG. 4B shows the 2-D small tilt micromirror device translated in an "x" direction a distance dx.
FIG. 4C shows the 2-D small tilt micromirror device translated in an "x" direction a distance (n-1)dx.
FIG. 4D shows the 2-D small tilt micromirror device translated in a "y" direction a distance dy.

FIG. 4A shows a DMD 30 with an optical beam cross section 32 under measurement centered over the DMD 30. By using these digital mode micromirrors 16, beam profile data can be measured, wherein the resolution of the system may be determined by the pixel size of an individual pixel of the DMD 30. To take power measurements at sub-pixel level to lead to higher resolution beam profiles, the DMD 30 is moved in an x-y plane 34 and beam profile measurements are taken at each translated x-y position of the DMD 30. In FIG. 4B, the DMD is moved in the x-direction by a small distance dx. Note that the beam remains at the original position. If the pixel/micromirror pitch in a DMD chip is divided into n sub-pixels, for example in the x direction, then the total chip displacement will be (n−1)dx as shown in FIG. 4C. Since the DMD is pixelated with periodic pixels, it is only necessary to translate the chip a maximum of one pixel pitch distance, Px, which typically corresponds to 13.8 microns for an Texas Instrument, Inc. IR DMD. Hence, for TI chip, if n=10, then d=1.38 microns. In effect, a profile resolution of 1.38 microns can be obtained after signal processing.

Figure 5:
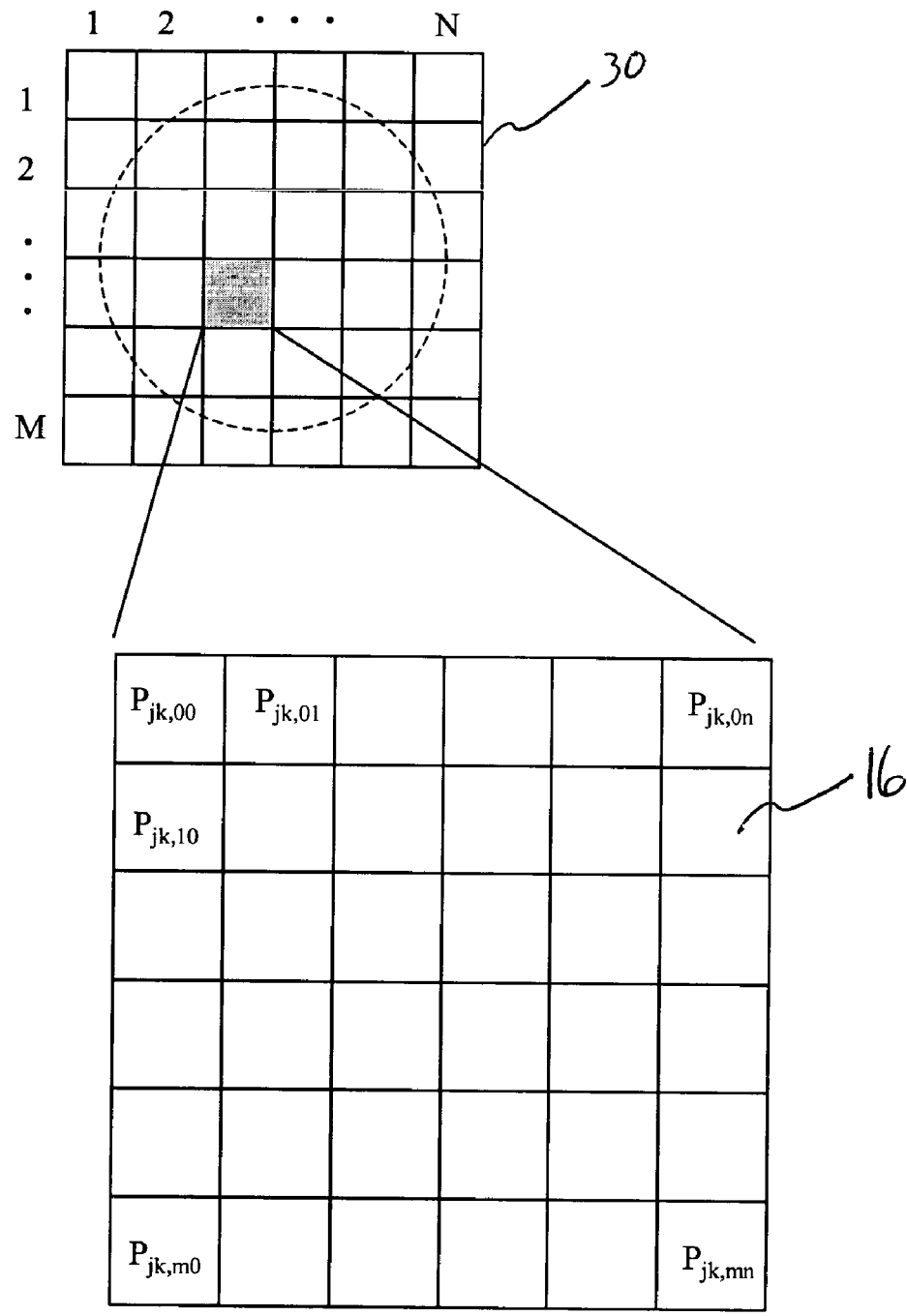
FIG. 5 shows how sub-pixels may be simulated via signal processing of data collected via the sub-pixel scale analog x-y motion of the 2-D DMD chip.

A similar procedure is repeated in the y-direction as shown in FIG. 4D. Once the data the desired translated chip positions has been obtained, then the power captured by sub-pixels (see FIG. 5) can be calculated. In this method the digital nature of the DMD and its physical analog movement on a pixel pitch scale are used to increase the resolution of the measurements which was previously not believed to be obtainable. FIG. 5 shows how sub-pixels are simulated via signal processing of data collected via the sub-pixel scale analog x-y motion of the 2-D DMD chip with M×N pixels.

Many beam profile measurement methods exist such as pinhole, knife edge and slit method. Using the digital-analog beam profiler as described above, the slit method can be combined with the pinhole method to give a new slit-inverse pinhole beam profiling method that can give highly accurate measurements with very little use of attenuators in the optical path. This method may reduce, and in some cases may eliminate, the need of using optical attenuators at the detector. The digital-analog optical beam profiler may be implemented with any type of fine analog x-y motion stage mounted digital 2-D spatial light modulator device such as using liquid crystals, magneto-optics, multiple quantum wells, electro-optic polymers, and photonic crystals.

Figure 6:
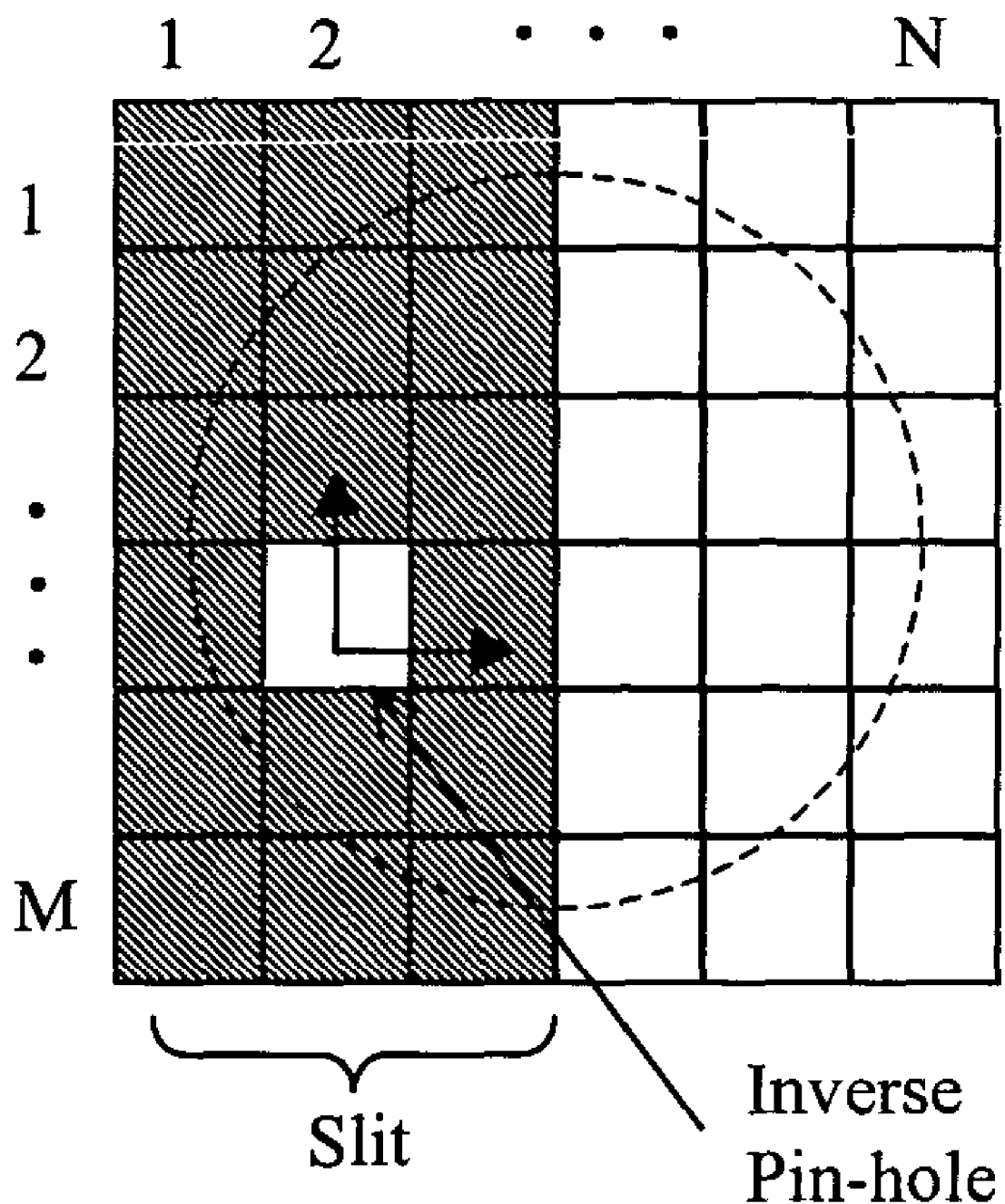
FIG. 6 illustrates working principles of an embodiment of the digital-analog beam profiler simulating a slit-inverse pin-hole method that leads to high resolution profile maps.

The procedure shown in FIG. 6 is as follows: First a variable size slit is opened on the DMD such that enough optical power is captured by the detector to operate in its best operating region. Once the desired slit size is achieved, it is fixed for further measurements. The width of the slit may depend on incident power at the slit position. Once enough power is let through to the detector, the individual pixels or sub-pixels (as explained in the previous section) will be switched to measure the light blocked by them (hence the name inverse pin-hole). Once the pinhole is scanned across this slit, for example, from the top to bottom of the slit, and power measurements are taken, the slit is translated in an orthogonal direction and the complete process is repeated beginning with slit size selection.

The slit-inverse pinhole method combines the best of both the slit and the pinhole method. The slit method gives a control on the power that is let through to the detector, thus eliminating the need for an attenuator at the detector. The pin-hole method on the other hand gives power measurements at each position on the beam, thus making the measurement accurate and reducing the processing requirements as in multiple knife edge and slit methods, hence reducing the numerical error and the processing time.

In another aspect of the invention, an agile optical beam profiler using a two-dimensional (2-D) small tilt digital micromirror device/chip may be used with single photodetector or a pair of photodetectors. Accordingly, accurate optical beam profile measurements that may be insensitive to optical power fluctuations of the light source under spatial measurement may be performed. Digital control of the micromirrors on the 2-D micromirror array chip in time multiplexed conjunction with full face power measurements provides a power referenced spatial measurement that is relatively insensitive to source power variations compared to other techniques. Another embodiment of the invention involves simultaneous use of two photodetectors for power measurement as the 2-D micromirror chip changes mirror settings to create mechanical moving objects such as slits or knife-edges used for spatial profiling. This method leads to optical source power insensitive spatial power maps of the beam profile. Any 2-D pixelated spatial light modulator device can be used to create the moving spatial samplers such as devices using liquid crystals, magneto-optics, multiple quantum wells, electro-optic polymers, and photonic crystals.

Figure 7:
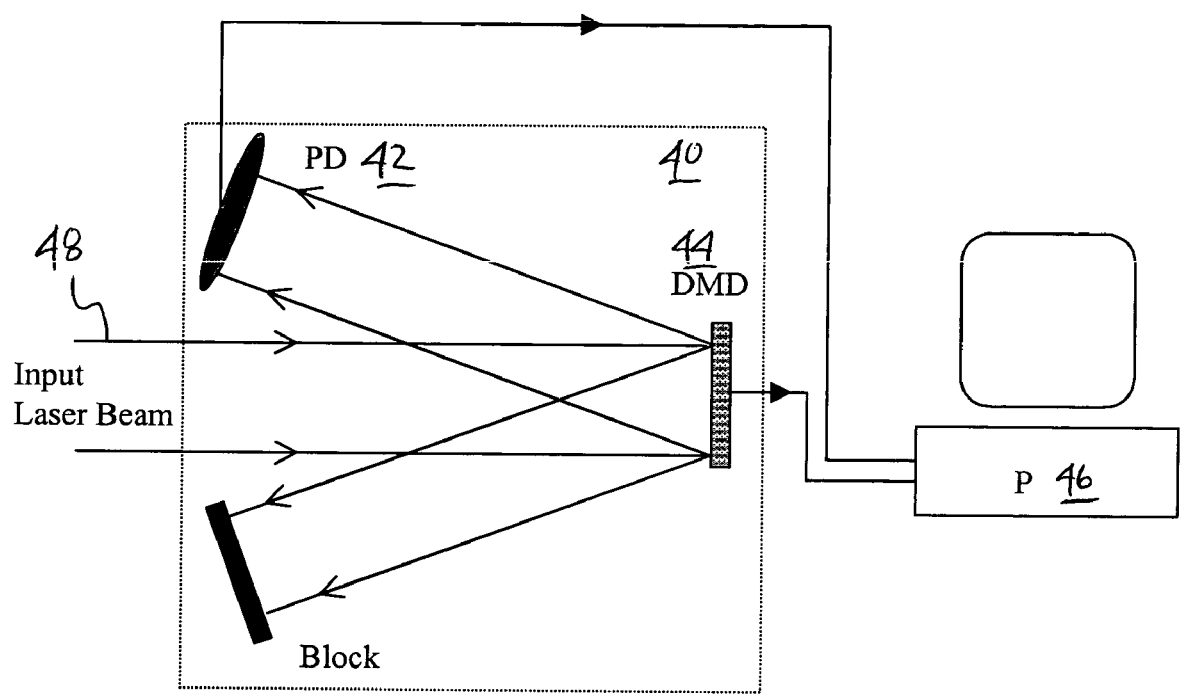
FIG. 7 shows a source power insensitive optical Beam Profiling Module using a single photo-detector (PD) for optical power measurements.

FIG. 7 shows a Beam Profiling Module 40 using single detector 42. Operation for source power insensitive beam profiling for this module 40 is as follows (and also shown in FIG. 8).

Step 1: Power from a slit k 50 is directed to the photo detector PD 42 (such as by controlling a linear set of pixels to direct a respective portion of the whole beam 48 to PD 42).

Step 2: Power from the whole beam 48 is directed to the photo detector PD 42 (such as by controlling linear sets of pixels illuminated by the whole beam to direct the whole beam 48 to PD 42.)

Step 3: Power from the slit (k+1) 52 is directed towards the photo detector PD 42.

Step 4: Power from the whole beam 48 is directed towards the photo detector PD 42.

This process is repeated for all the slit measurements. In this way, the power measured from individual slits can be normalized by the total power and the temporal power variation can be canceled leading to a source power fluctuation and value insensitive accurate beam profiling. A processor 46, such as a computer, may be used to control the positioning of the micromirrors in the DMD 44 and perform the normalization calculations based on information received from the PD 42.

Figure 9:
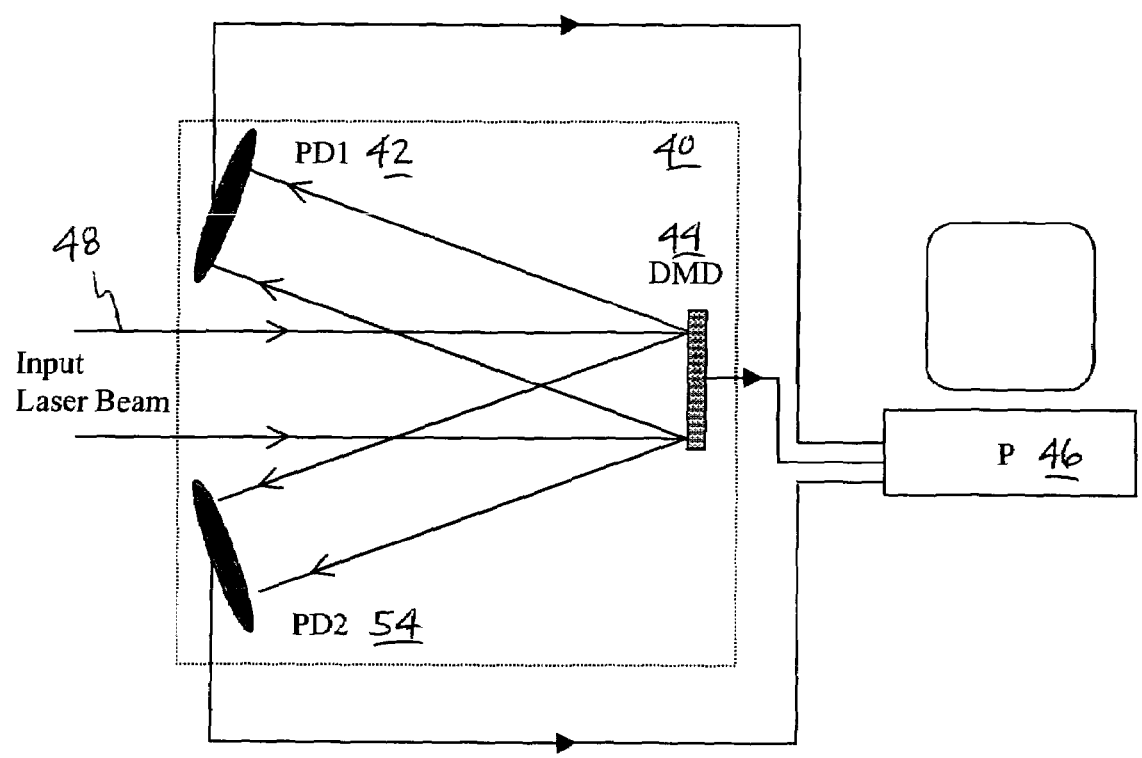
FIG. 9 shows a source power insensitive optical Beam Profiling Module using two detectors, PD1 and PD2, to take simultaneous optical power readings.
Figure 10:
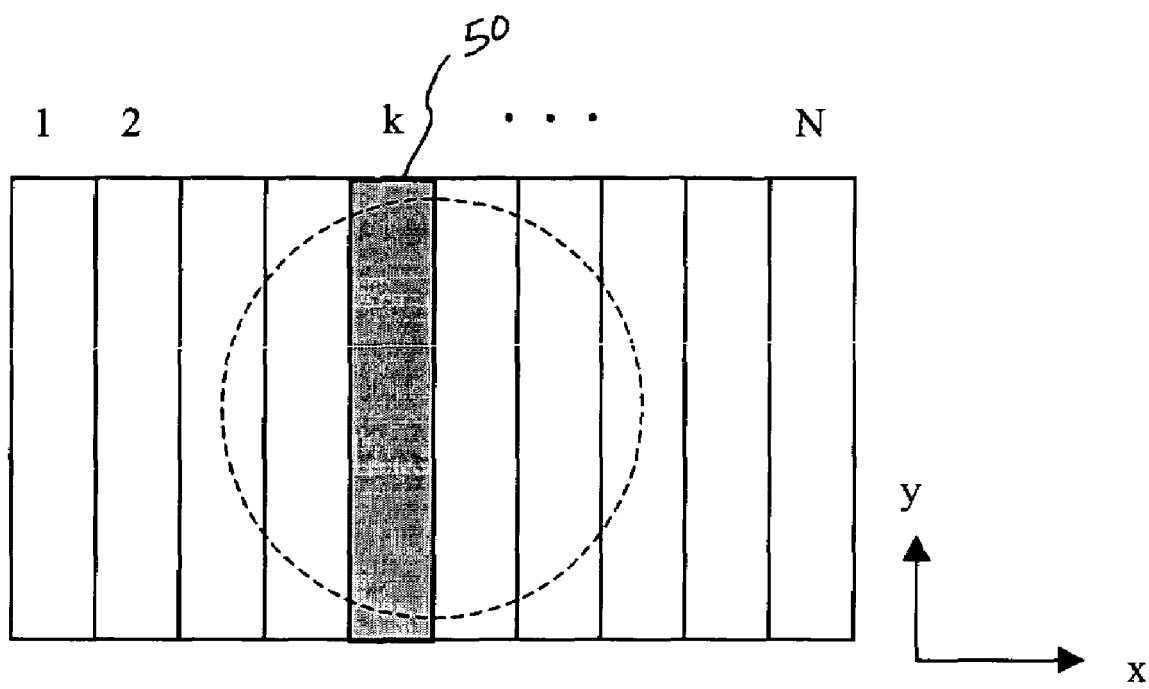
FIG. 10. DMD settings for a beam profiling technique using two PD's as shown in FIG. 9.

FIG. 9 shows an alternate embodiment of the proposed invention that is a Beam Profiling Module using two detectors, PD1 42 and PD2 54, for simultaneous power measurement. In this case, the profiler operation is as follows (and also shown in FIG. 10). As indicated in FIG. 10, power from the slit k 50 is directed to the photo detector PD1 42 and power from a complementary portion of the beam 48, (that is, the rest of the beam 48 other than the portion of the beam falling on the slit 50) is directed to photo detector PD2 54. Hence by this method, the measured power PD1 42 can be normalized by dividing it by the sum of powers received at PD1 42 and PD2 54. By using these two calibrated photodetectors PD1 42 and PD2 54, the total power and the power from the slit 50 can be measured simultaneously. Hence, the power fluctuations in the input beam 48 can be canceled, leading to source power level insensitive beam profiling. This is the case when PD1 42 and PD2 54 are calibrated detectors.

In the case that PD1 42 and PD2 54 are not calibrated, the FIG. 9 and FIG. 10 profiler method operates as follows with two photo-detectors, PD1 42 and PD2 54, operating simultaneously. Firstly, power from the slit k 50 is directed to the photo-detector PD1 42 and then the slit 50 is flipped to direct the total power of the beam 48 to the photo detector PD2 54. In this way the measured power at PD1 42 can be normalized by dividing it by power from PD2 54. By using two un-calibrated photo-detectors, the total power and the power from the slit 50 can be measured simultaneously. Hence, the power fluctuations in the input beam can be canceled even through PD1 42 and PD2 54 are not calibrated. Compared to the FIGS. 7 and 8 single PD 42 case where the PD 42 can also be uncalibrated, the FIGS. 9 and 10 method, using uncalibrated PDs, gathers data faster as not a large amount of micromirrors have to be flipped per reading.

In general, FIGS. 7–10 introduce the power insensitive digital optical beam profiling concept using only slit measurements. It is important to note that other mechanical aperture measurements can also be used with the proposed FIG. 7 and FIG. 9 systems such as pixel by pixel beam profiling, moving knife edge beam profiling, variable slit size beam profiling, variable aperture beam profiling, pinhole method, and inverse pinhole method.

While the preferred embodiments of the present invention have been shown and described herein, it will be obvious that such embodiments are provided by way of example only. Various modifications and variations will become apparent to those skilled in the art. It is intended therefore that the invention not be limited to the specific disclosed embodiment but be interpreted within the full spirit and scope of the appended claims.

What is claimed is:

1. A method of profiling an optical beam comprising:
   positioning a programmable spatial light modulator in an incident optical beam;
   sequentially moving the spatial light modulator to at least one position in a first planar direction in a displacement increment less than a pixel width of the spatial light modulator;
   directing respective portions of the optical beam to a photodetector at each position of the spatial light modulator;
   detecting a respective power of each portion of the incident optical beam directed to the photodetector at each position of the spatial modulator;
   correlating respective pixels of the spatial light modulator at each position with the respective detected power of each portion of the incident optical beam; and
   processing correlated detected powers to determine an optical beam profile of the incident optical beam.

2. The method of claim 1, further comprising moving the spatial light modulator in sequential increments to traverse a distance corresponding to the pixel width of the spatial light modulator.

3. The method of claim 1, further comprising sequentially moving the spatial light modulator to positions in a second planar direction orthogonal to the first planar direction in displacement increments less than a pixel width of the spatial light modulator.

4. The method of claim 1, further comprising simulating a knife edge, a moving slit, a pin hole, or a variable aperture passing through a cross section of the incident optical beam at each position.

5. The method of claim 4, further comprising:
   commanding a respective linear set of pixels of a spatial light modulator to direct respective portions of an incident optical beam to a photodetector;
   sequentially commanding each pixel of the linear set to direct respective pixel portions of the incident optical beam away from the photodetector; and
   detecting a respective power of each portion of incident optical beam directed to the photodetector.

6. The method of claim 5, further comprising selecting the linear set of pixels so that a total optical power directed to the photodetector is within a desired operating range of the photodetector.

7. An optical beam profiler comprising:
   a programmable spatial light modulator for selectively directing light from an incident optical beam;
   a translation stage for moving the spatial light modulator in relation to the incident optical beam;
   a photodetector for detecting a power of light directed by the spatial light modulator; and
   a processor configured to correlate a selection of light directed by the programmable light modulator with a respective power detected by the photodetector and process a plurality of correlated detected powers to determine an optical beam profile of the incident optical beam.

8. A method of profiling an optical beam comprising:
   commanding a respective linear set of pixels of a spatial light modulator to direct respective portions of an incident optical beam to a photodetector;
   sequentially commanding each pixel of the linear set to direct respective pixel portions of the incident optical beam away from the photodetector;
   detecting a respective power of each portion of incident optical beam directed to the photodetector;
   correlating the respective pixels of the spatial light modulator with a respective detected power of each portion of the incident optical beam; and processing correlated detected powers to determine an optical beam profile of the incident optical beam.

9. The method of claim 8, further comprising selecting the linear set of pixels so that a total optical power directed to the photodetector is within a desired operating range of the photodetector.

10. The method of claim 8, further comprising sequentially commanding respective linear sets of pixels of the spatial light modulator to direct respective portions to a photodetector in a first planar direction.

11. The method of claim 10, further comprising sequentially commanding respective linear sets of pixels of the spatial light modulator to direct respective portions to a photodetector in a second planar direction orthogonal to the first planar direction.

12. The method of claim 8, further comprising:
   sequentially moving the spatial light modulator to at least one position in a planar direction in a displacement increment less than a pixel width of the spatial light modulator; and
   detecting a respective power of each portion of the incident optical beam directed to the photodetector at each position.

13. The method of claim 12, further comprising moving the spatial light modulator in sequential increments to traverse a distance corresponding to the pixel width of the spatial light modulator.

14. A method of profiling an optical beam comprising:

positioning a programmable spatial light modulator in an incident optical beam;

sequentially commanding respective sets of pixels in the spatial light modulator to direct respective portions of the optical beam to a photodetector;

commanding, for each set, at least the pixels in the spatial light modulator illuminated by the optical beam, to direct the optical beam to the photodetector;

correlating respective sets of pixels of the spatial light modulator with a respective normalized power corresponding to a respective portion of the optical beam directed to the photodetector;

and processing correlated normalized powers to determine an optical beam profile of the incident optical beam.

15. The method of claim 14, further comprising, for each set:

detecting a first power corresponding to a respective portion of the optical beam directed to the photodetector; and detecting a second power corresponding to the optical beam directed to the photodetector.

16. The method of claim 15, further comprising, for each set, dividing the first power by the second power to calculate the normalized power.

17. A method of profiling an optical beam comprising:

positioning a programmable spatial light modulator in an incident optical beam;

sequentially commanding respective sets of pixels in the spatial light modulator to direct respective portions of the optical beam to a first photodetector;

simultaneously commanding respective remainders of the pixels, not included in each respective set, to direct respective complementary portions of the optical beam to a second photodetector;

correlating respective sets of pixels of the spatial light modulator with a respective normalized power corresponding to a respective portion of the optical beam directed to the photodetector;

and processing correlated normalized powers to determine an optical beam profile of the incident optical beam.

18. The method of claim 17, further comprising, for each set:

detecting a first power corresponding to the respective portion of the optical beam directed to the first photodetector; and detecting a second power corresponding to the respective complementary portion of the optical beam directed to the second photodetector.

19. The method of claim 18, further comprising, for each set:

adding the first and second powers to calculate a total power;

and dividing the first power by the total power to calculate the normalized power.

20. A method of calibrating at least two optical detectors comprising:

positioning a programmable spatial light modulator in an incident optical beam sequentially commanding respective sets of pixels in the spatial light modulator to direct respective portions of the optical beam to a first photodetector;

sequentially commanding the respective sets of pixels in the spatial light modulator to direct respective portions of the optical beam to a second photodetector;

correlating respective sets of pixels of the spatial light modulator with a respective normalized power corresponding to a respective portion of the optical beam directed to the first photodetector;

and processing correlated normalized powers to determine an optical beam profile of the incident optical beam.

21. The method of claim 20, further comprising, for each set:

detecting a first power corresponding to the respective portion of the optical beam directed to the first photodetector; and detecting a second power corresponding to the respective portion of the optical beam directed to the second photodetector.

22. The method of claim 21, further comprising, for each set, dividing the first power by the second power to calculate the normalized power.

* * * * *